(12) United States Patent
Campion

(10) Patent No.: US 6,802,477 B2
(45) Date of Patent: Oct. 12, 2004

(54) BLAST DEFLECTOR

(75) Inventor: Gordon Pearson Campion, South Queensferry (GB)

(73) Assignee: MacTaggart Scott (Holdings) Limited, Midlothian (GB)

( * ) Notice: Subject to any disclaimer, the term of this patent is extended or adjusted under 35 U.S.C. 154(b) by 117 days.

(21) Appl. No.: 10/378,232

(22) Filed: Mar. 3, 2003

(65) Prior Publication Data

US 2003/0164425 A1 Sep. 4, 2003

(30) Foreign Application Priority Data

Mar. 4, 2002 (GB) .............................................. 0205028

(51) Int. Cl.$^7$ .............................................. B63G 11/00
(52) U.S. Cl. ................... 244/114 B; 114/261
(58) Field of Search ......................... 244/114 B, 114 R; 114/261, 262

(56) References Cited

U.S. PATENT DOCUMENTS

| | | | | |
|---|---|---|---|---|
| 2,807,429 A | * | 9/1957 | Hawkins, Jr. et al. | ... 244/114 R |
| 3,141,639 A | * | 7/1964 | Klein | ...................... 244/114 B |
| 3,226,063 A | * | 12/1965 | Wagner | .................. 244/114 B |
| 5,429,324 A | | 7/1995 | Lynn | |
| 5,845,875 A | * | 12/1998 | Deel | ........................... 244/63 |
| 5,924,648 A | * | 7/1999 | Ellinthorpe | .................. 244/63 |
| 5,998,882 A | * | 12/1999 | Alston | .......................... 290/54 |
| 6,575,113 B1 | * | 6/2003 | Fischer et al. | ............... 114/261 |

FOREIGN PATENT DOCUMENTS

| | | | | |
|---|---|---|---|---|
| DE | 1 531 538 | | 4/1970 | |
| DE | 1531538 | * | 4/1970 | ............. B64F/1/26 |
| FR | 2 351 007 A1 | | 12/1977 | |
| FR | 2351007 | * | 12/1977 | ............. 244/114 R |
| GB | 902654 | * | 8/1962 | |
| GB | 2198400 A | * | 6/1988 | ............. B64F/1/00 |

* cited by examiner

Primary Examiner—Peter M. Poon
Assistant Examiner—Timothy D. Collins
(74) Attorney, Agent, or Firm—Alston & Bird LLP

(57) ABSTRACT

A jet blast deflector is adapted for location on a sea vessel. The jet blast deflector is configurable such that in use the jet blast deflector deflects eflux created by the blast of a jet engine of an aircraft downwardly and beneath the deck of a vessel.

33 Claims, 4 Drawing Sheets

BLAST DEFLECTOR

FIELD OF THE INVENTION

The present invention relates to a blast deflector, and in particular, but not exclusively, to a jet blast deflector for use on a sea vessel.

BACKGROUND OF THE INVENTION

Jet blast deflectors, as provided on the flight deck of aircraft carriers, are arranged to deflect the jet blast (eflux) upwardly when an aircraft is preparing to take-off, so as to protect aircraft and personnel from the eflux. However, conventional jet blast deflectors create numerous difficulties. The hot gases which result may create difficulties for aircraft which fly through the updraft of hot air, due to the decreased lift available in the hot air. Thus, during and following use of the deflector for an aircraft taking-off, aircraft must not fly in the vicinity of the deflector until the hot gases have dispersed.

The deflector is formed from an area of the deck which may be raised as required. As the surface of the deflector may be exposed to temperatures in the region of 1600° C. it is necessary that the deflector be water cooled. However, even with the aid of water cooling, it takes some time for the surface of the lowered deflector to cool sufficiently before it can be used safely as deck surface once more.

It is, therefore, amongst the objectives of an embodiment of the present invention to provide a jet blast deflector to obviate or at least mitigate at least one problem associated with the prior art.

SUMMARY OF THE INVENTION

According to a first aspect of the present invention, there is provided a jet blast deflector for location on a flight deck of a sea vessel, the jet blast deflector comprising a deflector member adapted to deflect eflux created by the blast of a jet engine of an aircraft downwardly and beneath the deck of the vessel.

In use, the present invention enables eflux to be directed away from the flight deck area therefore safeguarding personnel and other aircraft from the eflux generated by the aircraft during take-off. In addition, the invention provides the added advantage of directing hot gases away from the area directly above the vessel, and thus from the flight path of landing aircraft, thereby providing a relatively clean undisturbed airflow over the flight deck area.

Preferably the deflector member is moveable between a lowered or retracted configuration and a raised or extended configuration. In the retracted configuration a portion of the member may form a section of a deck area of the vessel. In the lowered configuration an upper surface of the member preferably lies flush with the deck area of the vessel, in order that personnel and aircraft may be transported over the member. Most preferably, in the raised configuration an underside or lower surface of the member is exposed to the eflux, and may be utilised to deflect the eflux generated by the jet engine of the aircraft below the deck surface.

By presenting the underside of the member to the eflux, exposure of the non-skid paint typically found on flight decks, and coated on a topside of the member, to the direct heat of the eflux is prevented. This is particularly useful as conventional non-skid paints deteriorate on exposure to high temperatures.

The jet blast deflector may include one or more baffles so as to help contain and direct the eflux. End baffles may assist in preventing the eflux from passing around the ends of the member. The baffles may be angled towards a centre of the deflector member, in order to help direct the eflux below the deck. Baffles may be provided intermediate the ends of the member.

The underside of the deflector member may be of a curved or concave shape; this form is preferred for dealing with eflux that is generated at sub-sonic speed, whilst for eflux travelling at supersonic speed it is preferred to have a planar surface, to provide for "reflection" of the eflux as it contacts the surface of the member. Of course in many instances it may be necessary to configure the underside as a compromise between deflecting both sub-sonic and supersonic flow.

Preferably, the jet blast deflector comprises actuation means for raising and lowering the deflector member. The actuation means may be hydraulic, although any appropriate means of actuation may be utilised, including pneumatic or electrically powered means. The actuation means may be coupled to end baffles of the deflector member, and may be adapted for location below the deck of the vessel.

The deflector member may comprise several sections that may be independently controlled such that the sections may be raised and lowered independently.

Preferably, the deflector further comprises a duct, channel or other conduit, to carry eflux redirected by the deflector beneath the deck, and most preferably to an outboard side of the sea vessel.

Preferably, the duct is adapted to run substantially parallel to the deck of the vessel.

Preferably also, an outlet end of the duct is located in an outboard side of the hull of the vessel.

Further preferably, the duct comprises cooling means for cooling at least one of the eflux and the duct. The eflux will thus be cooled as it passes through the duct before being vented outboard of the vessel. The cooling means may include nozzles to deliver a spray of water or other fluid to cool the eflux.

The duct may include means for creating an airflow or draft, in order to draw the eflux into the duct, and said means may include a fan, jet pump or the like.

The deflector member may incorporate conduits or a water jacket arrangement through which a coolant may be passed, so as to dissipate heat generated on the underside of the member by the eflux.

Alternatively, or in addition, the underside of the deflector member may comprise a passive heat shield. The heat shield may comprise high density ceramic tiles.

Preferably, the underside and topside of the deflector member are separated by thermal insulation, such that the topside of the member is not subjected to the high temperatures experienced by the underside of the deflector member. This provides the added advantage of maintaining the topside of the member relatively cool, such that as soon as the member is lowered the topside is cool enough for personnel and equipment, such as aircraft, to be immediately moved across the surface of the member.

Preferably, the deflector comprises a grill or guard such that when the deflector member is in a raised position the grill provides a safety barrier to help prevent personnel and other objects from falling beneath the deck.

The jet blast deflector may include a locking mechanism to ensure that the deflector member remains in a retracted or lowered position when not in operation.

According to a second aspect of the present invention, there is provided a method of channelling eflux, generated by a jet engine of an aircraft located on the deck of a sea vessel, the method comprising directing the eflux below the deck and outboard of the vessel.

Preferably the method includes the step of cooling the eflux.

BRIEF DESCRIPTION OF THE DRAWINGS

These and other aspects of the present invention will now be described, by way of example, with reference to the accompanying drawings, in which.

DETAILED DESCRIPTION OF THE DRAWINGS

A modern naval fleet includes aircraft carriers which provide a base and platform from which aircraft may be deployed to defend or launch an attack on a target.

The majority of aircraft deployed from these aircraft carriers are jet propelled, and it is necessary that such aircraft have their engines operating at full thrust at take-off to ensure that the aircraft attain sufficient velocity and lift for take-off once catapulted from the deck of the aircraft carrier.

Once an aircraft has been prepared ready for take-off, from any one of the catapults located on the deck of the aircraft carrier, the aircraft is manoeuvred onto the catapult and the catapult is hooked to the plane. Coupled to each plane is a T-bar which will pull the plane down the catapult. Once the aircraft is in position a jet blast deflector (JBD) is raised behind the tail of the aircraft. A hold-back device is attached to the aircraft in order to hold the aircraft in place. The aircraft's engines are then raised to full reheat, typically approximately 30 seconds before the aircraft is launched. During this time, the pilot makes final checks and the power setting of the catapult is checked. Once the engines are steady at full power and the pilot and launch personnel have made the necessary checks, the catapult is fired.

Jet blast deflectors (JBDs) are used to protect personnel and avoid damage to parked aircraft that are on the flight deck while an aircraft is preparing to take-off. In addition, JBDs avoid kicking up of foreign objects and debris from the deck, and leave a clean airflow for aircraft that are about to land behind the JBD and also for rescue helicopters already in the air.

Figure 1:
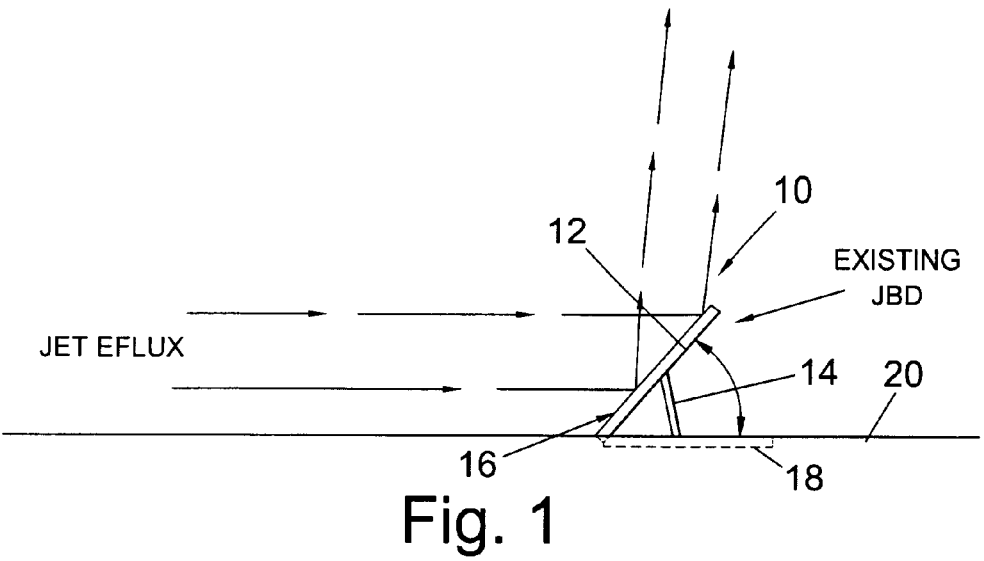
FIG. 1 is an illustration of a conventional jet blast deflector.

FIG. 1 illustrates a prior art jet blast deflector, represented generally by reference numeral 10. The jet blast deflector 10 comprises a, typically three meters long, plate 12 that is hinged at its leading edge and can be raised and lowered by a piston 14. When in a raised position a top surface 16 of the plate 12 is used to deflect exhaust jet blast (eflux) upwardly.

Due to the extreme temperatures that the top surface 16 is exposed to (in the region of 1600° C. and 10 MW of energy), it is necessary that the JBDs be water cooled in order to avoid distorting the JBD; ensuring that aircraft tyres and personnel can traverse the JBD after the JBD has been lowered, and to preserve the non slip paint surface provided on the JBD. When not in use the JBD can be retracted into a recess 18 provided in the flight deck 20, in which the operating hydraulics for the JBD are also contained.

Figure 2:
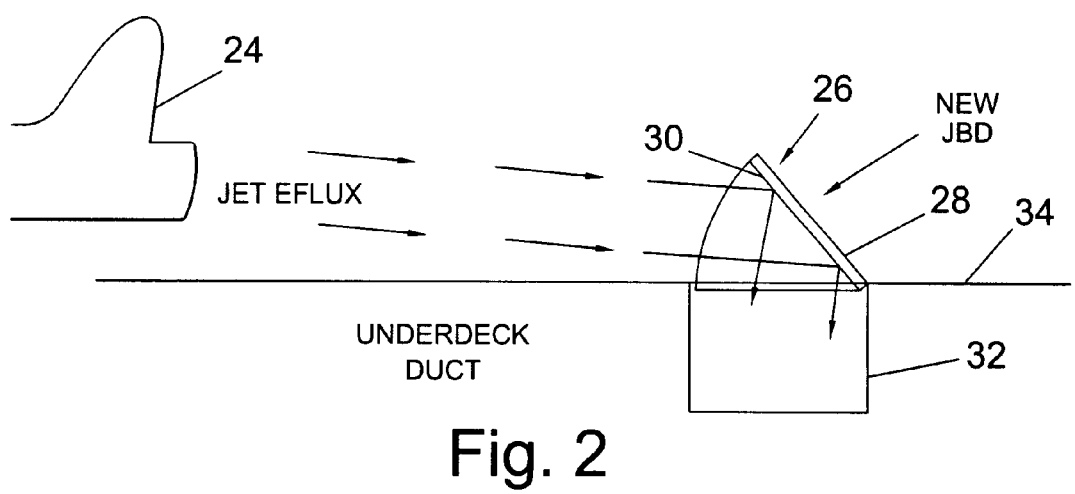
FIG. 2 is a schematic side view of a jet blast deflector according to an embodiment of the present invention.

Now referring to FIG. 2, there is shown a side view of a jet blast deflector according to an embodiment of the present invention. The jet blast deflector, which is generally represented by reference numeral 26, comprises a moveable deflector member 28. The member 28 is hinged at an end remote from an aircraft take-off position such that when the moveable member 28 is raised, an underside 30 of the member 28 is exposed to the eflux generated by the engine of the adjacent aircraft 24. The eflux, which may be at supersonic speeds, is propelled behind the aircraft 24 and is deflected downwardly by the JBD 26 into a duct 32 located beneath the deck 34 of the vessel.

Figure 3:
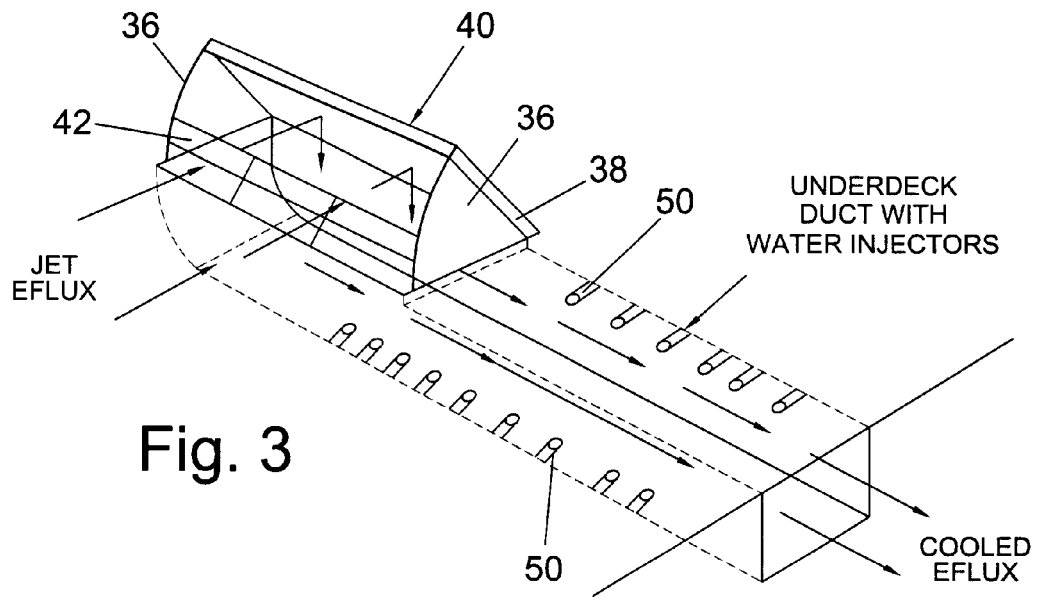
FIG. 3 is a perspective view of the deflector shown in FIG. 2.
Figure 4:
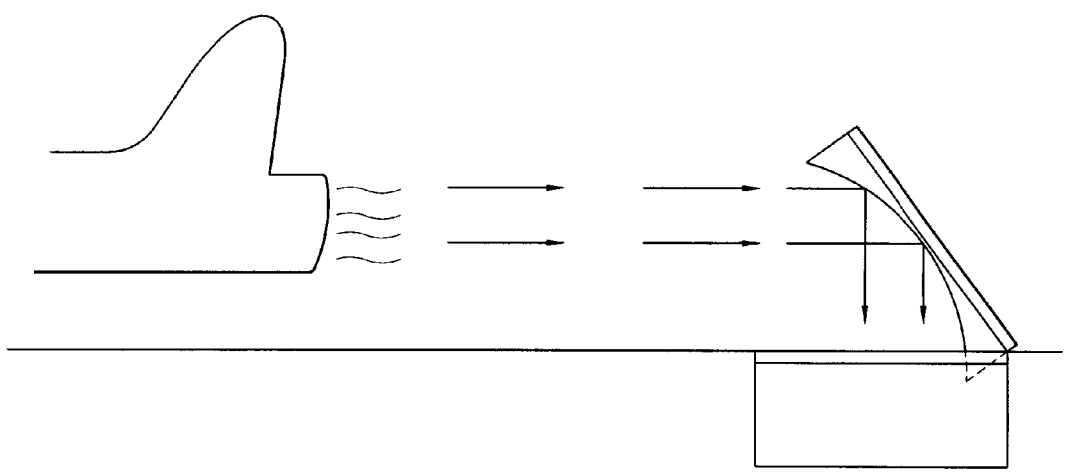
FIG. 4 is a schematic side view of a jet blast deflector in accordance with an embodiment of the present invention having a concave underside surface.

The underside of the JBD may be concave in order to direct the flow of the eflux into the duct as shown in the embodiment of FIG. 4. However, if the eflux is likely to be travelling at supersonic speeds, the underside is more preferably planar, as this will "reflect" the eflux into the duct 32, as illustrated in the FIGS. 1, 2 and 3.

Figure 6:
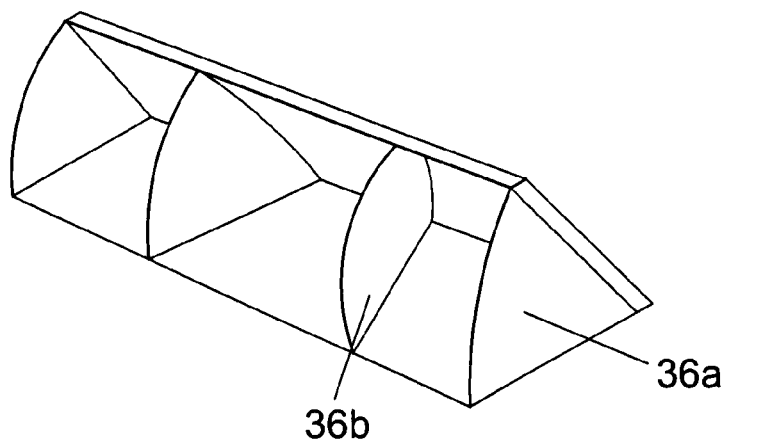
FIG. 6 is a perspective side view of a jet blast deflector having intermediate angled baffles in accordance with an embodiment of the present invention.

Referring to in particular to FIG. 3, the JBD 26 has end baffles 36, which contain and direct the eflux into the duct 32. In other embodiments the end and/or intermediate baffles 36a, 36b may be angled in order to help direct the eflux into the duct, as illustrated in FIG. 6.

The duct 32 runs beneath the deck 34 of the flight deck of the vessel. An opening into the duct 32 is provided in the flight deck, located a few meters behind an aircraft launching catapult. The outlet opening for the duct 32 is located outboard of the vessel.

The duct 32 is also provided with a cooling system, which enables the hot eflux to be cooled as it passes through the duct 32, before being vented outboard of the vessel. The cooling system includes nozzles 50 that deliver a spray of cooling water into the duct 32 in order to cool the eflux. In addition to cooling the eflux, the cooling system has the effect of reducing the volume of hot gas that is vented off. This provides the added advantage of reducing the IR signature of the vessel.

The deflector member 28 is provided with insulation 38 between the underside 30 and topside 40. The insulation 38 ensures that the topside 40 remains at a temperature that enables personnel and equipment to move across the deck surface formed by the topside of the lowered moveable member 28, as soon as the moveable member is lowered.

A grill 42 is provided between the baffles 36 so as to provide a guard to help prevent personnel and other objects from falling or being pushed into the duct 32 when the moveable member 28 is in the raised position.

Figure 5:
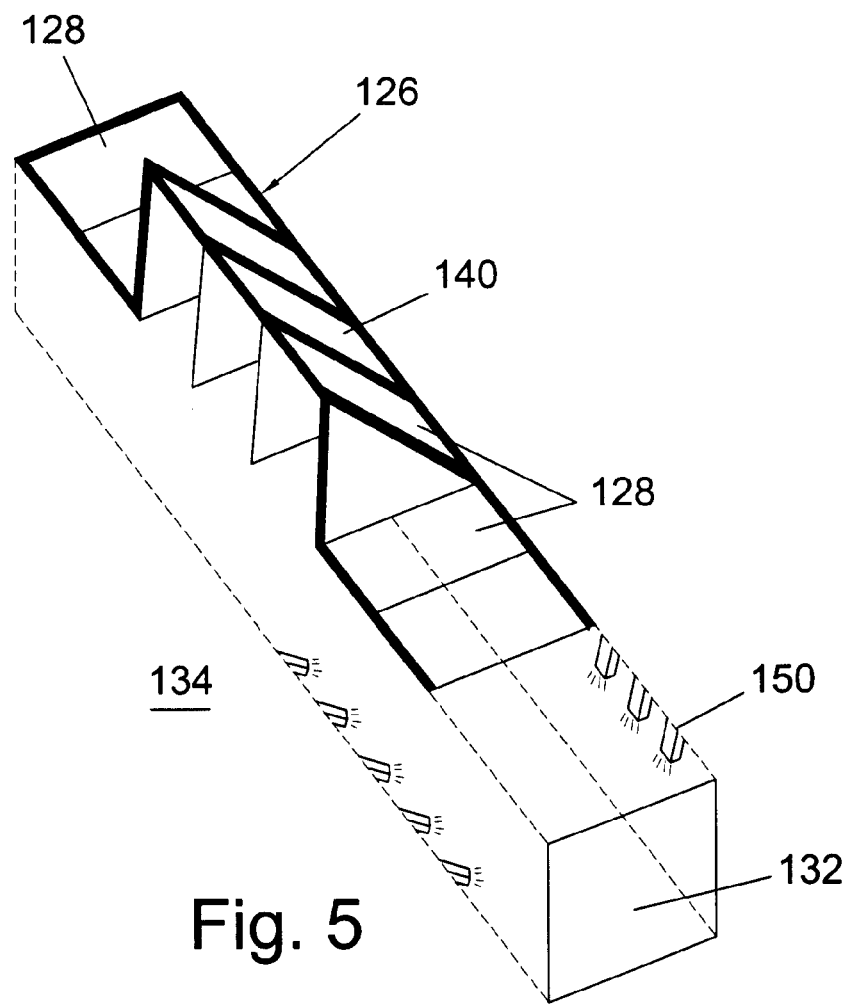
FIG. 5 is a perspective side view of a jet blast deflector comprising a number of independently controllable sections in accordance with an embodiment of the present invention.

Referring now to FIG. 5, there is shown a side view of a jet blast deflector (JBD) according to an alternative embodiment of the present invention. In this embodiment the jet blast deflector 126 comprises a plurality of moveable deflector members 128 which can be independently controlled. In this illustration the JBD 126 includes eight deflector members 128; two deflector members 128 at either end of the JBD 126 being in a retracted position, such that the deflector members 128 are flush with the deck 134 of the vessel.

In use, the jet blast deflector will be maintained in a lowered position until an aircraft is ready to take-off. Once an aircraft has been manoeuvred across the top of the JBD and positioned in place at the take off catapult, the jet blast protector will be raised. Once in its raised position, the aircraft's engines are powered up to full reheat. The raised JBD provides protection from the eflux generated by the aircraft for other aircraft and personnel on the flight deck behind the JBD, and assists in avoiding kicking up of foreign object debris.

In the raised position the JBD 26 exposes the underside of the member 28, and thus deflects the eflux created by the engines of the aircraft into the opening of the duct 32. As the eflux travels along the duct 32, it is cooled by the water spray system before being vented off at an outboard side of the vessel.

After the aircraft has taken-off, the JBD 26 is lowered and personnel and equipment can immediately traverse the topside of the JBD. While the JBD 26 is being lowered the underside may be continuously exposed to a water spray to ensure rapid cooling of the surface.

Figure 7:
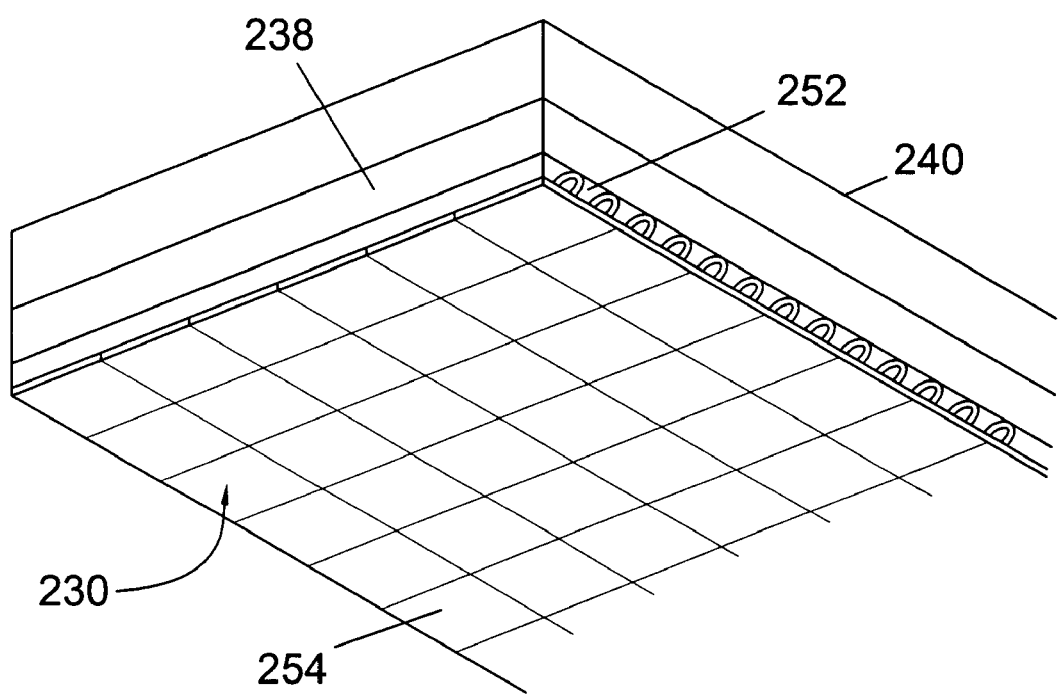
FIG. 7 is a perspective view from an underside of the deflector shown in FIG. 2 illustrating a possible construction of the deflector.

It will be appreciated that various modifications may be made to the embodiment hereinbefore described without departing from the scope of the present invention. For example, as illustrated in FIG. 7, the underside 230 of the deflector member 228 may be provided with a water jacket 252 or the like to ensure cooling of the underside 230. Alternatively or in addition, the underside 230 may be provided with a passive heat shield 254.

The duct may be provided with means to induce a pressure differential such that the eflux may be drawn into the duct such as a fan or a jet-pump arrangement.

The jet blast deflector may be provided with a locking mechanism to ensure that the deflector member remains in a lowered position when not in use.

What is claimed is:

1. A jet blast deflector system located on a flight deck of a sea vessel, the jet blast deflector comprising a deflector member adapted to deflect eflux created by the blast of a jet engine of an aircraft on the flight deck downwardly into a duct located beneath the flight deck of the vessel, the duct adapted to redirect the eflux outboard of the sea vessel below the flight deck.

2. The jet blast deflector as claimed in claim 1, wherein the jet blast deflector further comprises a surface adapted to be exposed to the eflux.

3. The jet blast deflector as claimed in claim 1, wherein the deflector member is moveable between a retracted configuration and an extended configuration.

4. The jet blast deflector as claimed in claim 3, wherein in the retracted configuration a portion of the member is adapted to form a section of a deck area of the vessel.

5. The jet blast deflector as claimed in claim 3, wherein in the retracted configuration an upper surface of the member is adapted to lie flush with the deck area of the vessel.

6. The jet blast deflector as claimed in claim 3, wherein in the extended configuration an underside of the member is adapted to be exposed to the eflux.

7. The jet blast deflector as claimed in claim 2, wherein said surface of the member is adapted to deflect the eflux generated by the jet engine of the aircraft below the deck surface.

8. The jet blast deflector as claimed in claim 1, wherein the jet blast deflector includes at least one baffle operatively associated with the deflector member.

9. The jet blast deflector as claimed in claim 8, comprising baffles located at ends of the deflector member.

10. The jet blast deflector as claimed in claim 8, wherein the at least one baffle is angled towards a centre of the deflector member.

11. The jet blast deflector as claimed in claim 8, wherein the at least one baffle is provided intermediate ends of the deflector member.

12. The jet blast deflector as claimed in claim 2, wherein said surface of the deflector member is curved.

13. The jet blast deflector as claimed in claim 2, wherein said surface of the deflector member is concave.

14. The jet blast deflector as claimed in claim 2, wherein said surface of the deflector member is planar.

15. The jet blast deflector as claimed in claim 1, wherein the jet blast deflector comprises actuation means for raising and lowering the deflector member.

16. The jet blast deflector as claimed in claim 15, wherein the actuation means is hydraulically powered.

17. The jet blast deflector as claimed in claim 15, wherein the actuation means is coupled to a baffle of the deflector member.

18. The jet blast deflector as claimed in claim 15, wherein the actuation means is adapted for location below the deck of the vessel.

19. The jet blast deflector as claimed in claim 1, wherein the deflector member comprises a plurality of independently moveable sections.

20. The jet blast deflector as claimed in claim 1, wherein the deflector is adapted to redirect the eflux to an outboard side of the sea vessel.

21. The jet blast deflector as claimed in claim 1, wherein the duct is adapted to run substantially parallel to the deck of the vessel.

22. The jet blast deflector as claimed in claim 1, wherein an outlet end of the duct is adapted for location in an outboard side of the hull of the vessel.

23. The jet blast deflector as claimed in claim 1, wherein the duct comprises cooling means for cooling at least one of the eflux and the duct.

24. The jet blast deflector as claimed in claim 23, wherein the cooling means includes nozzles adapted to deliver a spray of fluid.

25. The jet blast deflector as claimed in claim 24, wherein the nozzles are directed so as to create an airflow in order to draw the eflux into the duct.

26. The jet blast deflector as claimed in claim 1, wherein the deflector member incorporates a water jacket arrangement.

27. The jet blast deflector as claimed in claim 2, wherein said surface of the deflector member comprises a passive heat shield.

28. The jet blast deflector as claimed in claim 27, wherein the heat shield comprises high density ceramic tiles.

29. The jet blast deflector as claimed in claim 1, wherein opposite surfaces of the deflector member are separated by thermal insulation.

30. The jet blast deflector as claimed in claim 1, wherein the jet blast deflector further comprises a guard.

31. The jet blast deflector as claimed in claim 1, wherein the jet blast deflector includes a locking mechanism to ensure that the deflector member remains in a retracted configuration when not in operation.

32. A method of channelling eflux, generated by a jet engine of an aircraft located on the deck of a sea vessel, the method comprising directing the eflux below the deck into a duct and then outboard of the sea vessel below the deck.

33. The method as claimed in claim 32, wherein the method includes the step of cooling the eflux.

* * * * *